(12) United States Patent
Abraham et al.

(10) Patent No.: US 9,510,292 B2
(45) Date of Patent: Nov. 29, 2016

(54) LIMITING WIRELESS DISCOVERY RANGE

(71) Applicant: QUALCOMM Incorporated, San Diego, CA (US)

(72) Inventors: Santosh Paul Abraham, San Diego, CA (US); George Cherian, San Diego, CA (US); Hemanth Sampath, San Diego, CA (US); Rolf De Vegt, San Francisco, CA (US); Simone Merlin, San Diego, CA (US); Alireza Raissinia, Monte Sereno, CA (US); Vinay Sridhara, Santa Clara, CA (US)

(*) Notice: Subject to any disclaimer, the term of this patent is extended or adjusted under 35 U.S.C. 154(b) by 399 days.

(21) Appl. No.: 13/763,521

(22) Filed: Feb. 8, 2013

(65) Prior Publication Data
US 2013/0250931 A1     Sep. 26, 2013

Related U.S. Application Data

(60) Provisional application No. 61/610,320, filed on Mar. 13, 2012.

(51) Int. Cl.
| | | |
|---|---|---|
| *H04W 4/00* | (2009.01) | |
| *H04W 52/04* | (2009.01) | |
| *H04W 8/00* | (2009.01) | |
| *H04W 48/12* | (2009.01) | |
| *H04W 28/02* | (2009.01) | |
| *H04W 64/00* | (2009.01) | |
| *H04W 84/18* | (2009.01) | |

(52) U.S. Cl.
CPC ............ *H04W 52/04* (2013.01); *H04W 8/005* (2013.01); *H04W 28/021* (2013.01); *H04W 48/12* (2013.01); *H04W 64/006* (2013.01); *H04W 84/18* (2013.01)

(58) Field of Classification Search
CPC ... H04W 8/005; H04W 48/02; H04W 48/04; H04W 48/06; H04W 48/08; H04W 48/10; H04W 48/12; H04W 48/14; H04W 48/16; H04W 48/17; H04W 48/18; H04W 48/20
See application file for complete search history.

(56) References Cited

U.S. PATENT DOCUMENTS 7,852,778 B1 * 12/2010 Kompella ..................... 370/248
2005/0021725 A1 * 1/2005 Lobbert ........................ 709/223

(Continued)

FOREIGN PATENT DOCUMENTS

| WO | 2007121414 A2 | 10/2007 |
|---|---|---|
| WO | 2010143130 A1 | 12/2010 |

OTHER PUBLICATIONS

International Search Report and Written Opinion—PCT/US2013/030989—ISA/EPO—Sep. 3, 2013.

(Continued)

*Primary Examiner* — Kevin Mew

(57) ABSTRACT

Systems and methods of limiting wireless discovery range. A transmitting device may limit wireless discovery range by adjusting one or more transmission attributes of a discovery message, measuring inter-device distance based on range determination messages, or any combination thereof. A receiving device may limit wireless discovery range based on one or more attributes of a received discovery message, measuring inter-device distance based on range determination messages, or any combination thereof. Discovery messages may include a range adaptation bit indicating whether range adaptation is to be performed.

30 Claims, 11 Drawing Sheets

(56) References Cited

U.S. PATENT DOCUMENTS

| | | | |
|---|---|---|---|
| 2005/0255839 A1* | 11/2005 | Perttila | H04M 1/7253 455/419 |
| 2006/0045056 A1 | 3/2006 | O'hara, Jr. | |
| 2007/0140163 A1* | 6/2007 | Meier et al. | 370/329 |
| 2007/0287386 A1 | 12/2007 | Agrawal et al. | |
| 2008/0004044 A1* | 1/2008 | Simpson et al. | 455/458 |
| 2008/0076419 A1* | 3/2008 | Khetawat et al. | 455/435.1 |
| 2008/0310421 A1* | 12/2008 | Teisberg et al. | 370/395.53 |
| 2009/0137260 A1* | 5/2009 | Son | 455/466 |
| 2009/0209268 A1 | 8/2009 | Ha et al. | |
| 2009/0232094 A1* | 9/2009 | Cheng et al. | 370/331 |
| 2009/0233551 A1 | 9/2009 | Haartsen et al. | |
| 2010/0135178 A1* | 6/2010 | Aggarwal | G01S 5/0205 370/252 |
| 2010/0157820 A1* | 6/2010 | Cheng et al. | 370/252 |
| 2011/0140864 A1 | 6/2011 | Bucci | |
| 2011/0201369 A1 | 8/2011 | Kim et al. | |
| 2012/0014271 A1* | 1/2012 | Damenti | 370/252 |
| 2012/0051244 A1 | 3/2012 | Nagara | |
| 2012/0113971 A1 | 5/2012 | Giaretta et al. | |
| 2012/0170462 A1* | 7/2012 | Sinha | 370/236 |
| 2012/0198051 A1 | 8/2012 | Maenpaa | |
| 2012/0230302 A1* | 9/2012 | Calcev et al. | 370/336 |
| 2012/0281699 A1* | 11/2012 | Jia | H04W 8/005 370/392 |
| 2013/0097324 A1* | 4/2013 | Meng et al. | 709/227 |
| 2013/0343323 A1* | 12/2013 | Kang | H04W 72/04 370/329 |
| 2014/0029566 A1* | 1/2014 | Choi | H04W 48/12 370/329 |
| 2014/0254569 A1* | 9/2014 | Abraham | H04L 5/0092 370/336 |
| 2014/0254575 A1* | 9/2014 | Venkatraman | H04W 48/16 370/338 |
| 2015/0139213 A1* | 5/2015 | Abraham | H04L 69/28 370/338 |
| 2015/0172391 A1* | 6/2015 | Kasslin | H04L 67/16 370/338 |
| 2015/0334638 A1* | 11/2015 | Kim | H04W 48/14 370/329 |
| 2015/0373749 A1* | 12/2015 | Palin | H04W 76/02 455/41.2 |

OTHER PUBLICATIONS

Partial International Search Report—PCT/US2013/030989—ISA/EPO—Jun. 13, 2013.
Zhou, et al., "ZiFi: Wireless LAN Discovery Via ZigBee Interference Signatures", MobiCom '10, Sep. 2010, 13 pp.
U.S. Appl. No. 61/570,704, filed Dec. 14, 2011.
U.S. Appl. No. 13/706,792, filed Dec. 6, 2012.
U.S. Appl. No. 13/706,801, filed Dec. 6, 2012.
U.S. Appl. No. 12/562,167, filed Jul. 30, 2012.

* cited by examiner

LIMITING WIRELESS DISCOVERY RANGE

CROSS-REFERENCE TO RELATED APPLICATIONS

The present application claims priority from commonly owned U.S. Provisional Patent Application No. 61/610,320 filed Mar. 13, 2012, the content of which is expressly incorporated herein by reference in its entirety.

BACKGROUND

1. Field

The present disclosure relates to discovery messages in wireless networks.

2. Background

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

In some communication systems, communications networks may be used to exchange messages among several interacting spatially-separated devices. Networks may be classified according to geographic scope, which could be, for example, a metropolitan area, a local area, or a personal area. Such networks may be designated respectively as a wide area network (WAN), a metropolitan area network (MAN), a local area network (LAN), a wireless local area network (WLAN), or a personal area network (PAN). Networks may also differ according to the switching/routing techniques used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks may be preferred when network elements are mobile and have dynamic connectivity needs or if the network architecture is formed in an ad hoc, rather than fixed, topology. Wireless networks may employ intangible physical media in an unguided propagation mode using electromagnetic waves in the radio, microwave, infra-red, optical, or other frequency bands. Wireless networks may advantageously facilitate user mobility and rapid field deployment when compared to fixed wired networks.

Devices in a wireless network may transmit/receive information between each other. The information may include packets. The packets may include overhead information (e.g., header information, packet properties, etc. that helps in routing the packets through the network) as well as data (e.g., user data, multimedia content, etc. in a payload of the packet). One type of packet, called a discovery packet, may be used to introduce two different devices communicating via a medium that is shared by multiple devices.

SUMMARY

Wireless networks are typically used as an access medium. For example, most wireless networks include an access point that facilitates communication between locally connected devices and an external network, such as the Internet. Nevertheless, as wireless devices become more common, networks may be formed for reasons other than to provide access to an external network. For example, when numerous wireless devices coexist in a fixed space (e.g., a stadium or a classroom), it may be useful for the wireless devices to communicate directly to each other (e.g., to share messages, multimedia, etc.). This type of ad hoc localized wireless networking may be referred to as "social Wi-Fi." However, the coexistence of many wireless devices in a relatively small area may lead to medium congestion. For example, consider two adjacent classrooms in a school, where each classroom attempts to form its own social Wi-Fi network. Devices operating in one classroom may conflict or interfere with devices operating in the other classroom. In such a situation, it may be beneficial to predicate wireless discovery on inter-device distance, so that students in one classroom can communicate with each other without detecting messages between students in the other classroom.

Systems and methods of limiting wireless discovery range are disclosed. A device sending a discovery message may limit decoding of the discovery message to a receiving device that is within a particular discovery range threshold. When a wireless discovery range is limited, the discovery message may be considered "range adapted." For example, a device may adjust a transmit power and/or a modulation and coding scheme (MCS) of an outgoing discovery message such that the message is not (or cannot be) decoded outside the discovery range threshold. A receiving device may range adapt a discovery message by decoding or discarding the discovery message based on how far the receiving device is from the transmitting device. Decoding a discovery message may trigger additional actions at the receiving device, such as displaying data or navigating to a uniform resource locator (URL).

The techniques described herein may utilize various metrics to determine or estimate the distance between two devices, including, but not limited to, transmit power, MCS, received signal strength indication (RSSI), time elapsed between sending a range determination message (e.g., a request-to-send (RTS) message) and receiving a range determination response (e.g., a clear-to-send (CTS) message), and a location request/response exchange.

In a heterogeneous network that supports communication of both range adapted and range independent discovery messages, each discovery message may include a range adaptation bit indicating whether range adaptation is to be performed by a receiving device. Range adapted discovery messages may also include the corresponding discovery range threshold to be used by the receiving device in determining whether to decode or discard the discovery message.

In a particular embodiment, a method includes adjusting a transmission attribute at a first device based on a discovery range threshold. In response to sending a discovery message from the first device in accordance with the adjusted transmission attribute, a second device at a distance within the discovery range threshold decodes the discovery message and a third device at a distance outside the discovery range threshold discards or fails to decode the discovery message.

In another particular embodiment, a method includes determining, at a first device, a discovery range threshold that limits a distance from the first device at which a second device is operative to decode a discovery message. The method also includes adjusting a transmission attribute at the first device based on the discovery range threshold and sending the discovery message in accordance with the adjusted transmission attribute.

In another particular embodiment, an apparatus includes a processor and a memory storing instructions executable by the processor to receive at a second device a discovery message sent from a first device. The instructions are also executable by the processor to determine a distance between the second device and the first device based on at least one attribute of the discovery message. The instructions are further executable by the processor to decode the discovery message when the distance is within a discovery range threshold and to discard the discovery message when the distance is outside the discovery range threshold.

In another particular embodiment, an apparatus includes a processor and a memory storing instructions executable by the processor to send a range determination message from a first device to a second device and to receive a range determination response at the first device from the second device. The instructions are also executable by the processor to determine a distance between the first device and the second device based on an elapsed time between the sending of the range determination message and the receiving of the range determination response. The instructions are further executable by the processor to send a discovery message from the first device to the second device in response to determining that the distance is within a discovery range threshold.

In another particular embodiment, a method includes sending a range determination message to a first device from a second device and receiving at the second device a range determination response from the first device. The method also includes determining a distance between the second device and the first device based on an elapsed time between the sending of the range determination message and the receiving of the range determination response. The method includes decoding a discovery message received from the first device when the distance is within a discovery range threshold and discarding the discovery message received from the first device when the distance is outside the discovery range threshold.

In another particular embodiment, a method includes sending a discovery message from a first device to a second device. The discovery message includes data indicating whether a range determination mechanism is to be used to determine whether to perform an action (e.g., connection setup) in response to the discovery message.

In another particular embodiment, a method includes receiving a discovery message from a first device at a second device, where the discovery message includes a range adaptation indicator bit. The method also includes decoding the discovery message when the range adaptation bit has a first value. The method includes, when the range adaptation bit has a second value, selectively decoding or discarding the discovery message based on whether a distance between the second device and the first device is within a discovery range threshold included in or defined by the discovery message.

In another particular embodiment, a method includes receiving a discovery message from a first device at a second device. The method also includes sending a request for a location of the first device and receiving a response indicating the location of the first device. The method further includes determining a distance between the second device and the first device based on the location of the first device. The method includes selectively decoding or discarding the discovery message based on whether the distance is within a discovery range threshold.

In another particular embodiment, a method includes receiving a message (e.g., a discovery message or a query message) from a first device at a second device and executing a first range determination mechanism in response to determining that the message indicates that range determination is to be performed. The method also includes discarding the message when a result of the first range determination mechanism indicates that the first device and the second device are separated by a distance that is greater than or equal to a first range threshold. The method further includes executing a second range determination mechanism when the result of the first range determination mechanism indicates that the first device and the second device are separated by a distance that is less than the first range threshold. The method includes selectively discarding the message or performing at least one action in response to the message based on a result of the second range determination mechanism.

One particular advantage provided by at least one of the disclosed embodiments is an ability of transmitting devices and receiving devices to individually limit wireless communication discovery range.

Other aspects, advantages, and features of the present disclosure will become apparent after review of the entire application, including the following sections: Brief Description of the Drawings, Detailed Description, and the Claims.

DETAILED DESCRIPTION

Figure 1:
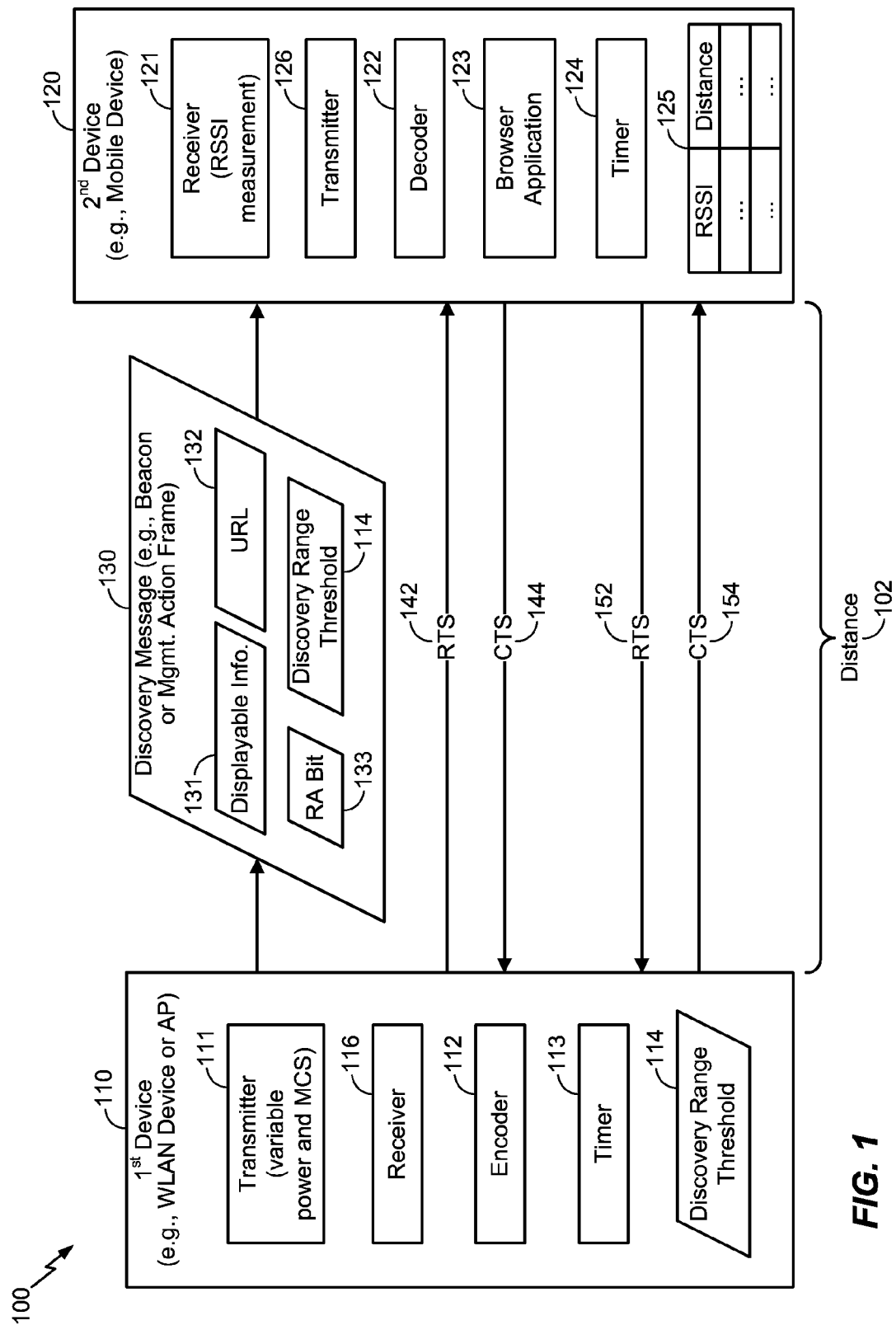
FIG. 1 is a diagram of a particular embodiment of a system that is operable to limit wireless discovery range.

FIG. 1 is a diagram of a particular embodiment of a system 100 that is operable to limit wireless discovery range. The system 100 may include a first device 110 and a second device 120 separated by a distance 102.

In a particular embodiment, the first device 110 may be a WLAN device, an access point (AP), or any combination thereof. The second device 120 may be a mobile device, such as a mobile telephone, a portable computing device, a tablet computing device, a personal digital assistant (PDA), a portable media player, or any combination thereof.

The first device 110 may include a transmitter 111 and a receiver 116. Although illustrated in FIG. 1 as single blocks, the transmitter 111 and the receiver 116 may each represent various hardware and/or software components used in transmitting and receiving wireless messages. The transmitter 111 may be configured to vary one or more transmission attributes of outgoing messages. For example, the transmitter 111 may vary transmit power and MCS for particular messages, such as a discovery message 130, a range determination message (e.g., an illustrative RTS message 142), and a range determination response (e.g., an illustrative CTS message 154). In a particular embodiment, the transmitter 111 and the receiver 116 may be integrated (e.g., into a transceiver).

The first device 110 may also include an encoder 112 configured to encode the discovery message 130 and a timer 113 (e.g., a hardware timer or a software timer). In a particular embodiment, the first device 110 may store a discovery range threshold 114. The discovery range threshold 114 may represent a distance outside of which devices receiving the discovery message 130 (e.g., the second device 120) will not or cannot decode the discovery message 130 (or at least a portion thereof). In a particular embodiment, the discovery message 130 may be an Institute of Electrical and Electronics Engineers (IEEE) beacon (or an information element (IE) thereof) or a management action frame that is broadcast periodically (e.g., every 100 milliseconds). Data encoded into the discovery message 130 may include displayable information 131 and/or a URL 132. When the discovery message 130 is decoded, the displayable information 131 may be automatically displayed by the decoding device and the URL 132 may be automatically navigated to by the decoding device.

In a particular embodiment, the discovery message 130 may also include a range adaptation (RA) bit 133. The range adaptation bit 133 may indicate whether or not range adaptation is to be performed for the discovery message 130. Thus, the range adaptation bit 133 may indicate whether the second device 120 is to decode the discovery message 130 from the first device 110 independent of whether the inter-device distance 102 between the first device 110 and the second device 120 is within the discovery range threshold 114. When the range adaptation bit 133 has a first value (e.g., zero), the discovery message 130 may be a range independent discovery message that is always decoded. When the range adaptation bit 133 has a second value (e.g., one), the discovery message 130 may be a range adapted discovery message that is selectively decoded or discarded based on whether the distance 102 is within the discovery range threshold 114. In a particular embodiment, the first device 110 may include the discovery range threshold 114 in the discovery message 130, as shown.

The second device 120 may include a transmitter 126 and a receiver 121. Although illustrated in FIG. 1 as single blocks, the transmitter 126 and the receiver 121 may each represent various hardware and/or software components used in transmitting and receiving wireless messages. The receiver 121 may be configured to measure one or more attributes of incoming messages. For example, the receiver 121 may measure a received signal strength indication (RSSI) of the discovery message 130. The transmitter 126 may be operable to send one or more messages to the first device 110, such as a range determination response (e.g., an illustrative CTS message 144) and a range determination message (e.g., an illustrative RTS message 152). In a particular embodiment, the transmitter 126 and the receiver 121 may be integrated (e.g., into a transceiver).

The second device 120 may also include a decoder 122 configured to decode the discovery message 130 and a timer 124 (e.g., a hardware timer or a software timer). The second device 120 may also include one or more applications, such as a browser application 123. In a particular embodiment, the browser application 123 may be used to navigate to the URL 132 included in the discovery message 130.

In one embodiment of operation, the first device 110 may limit wireless discovery range by varying a transmission attribute of the discovery message 130. For example, the first device 110 may elect to limit discovery range to the discovery range threshold 114 (e.g., 3 feet). The discovery range threshold 114 may be set by the first device 110 or may be received from an external device (e.g., in a programming message). The transmitter 111 may adjust a transmit power and/or a MCS of the discovery message 130 based on the discovery range threshold 114. The adjusted transmit power and/or MCS may operate to limit decodability of the discovery message 130 outside the discovery range threshold 114. Thus, if the distance 102 is within the discovery range threshold 114 (e.g., less than or equal to 3 feet), the second device 120 may decode the discovery message 130. Conversely, if the distance 102 is outside the discovery range threshold 114 (e.g., greater than 3 feet), the second device 120 may discard or fail to decode the discovery message 130.

Alternately, the first device 110 may limit wireless discovery range by using the timer 113 to measure the distance 102. For example, the first device 110 may send a range determination message (e.g., the RTS message 142) to the second device 120 and may receive a range determination response (e.g., the CTS message 144), in accordance with an underlying wireless protocol (e.g., an IEEE 802.11 protocol). The timer 113 may be started upon sending the RTS message 142 and may be stopped upon receiving the CTS message 144. Based on the time elapsed, the first device 110 may estimate the distance 102. If the distance 102 is within the discovery range threshold 114, the first device 110 may send the discovery message 130 to the second device 120. The first device 110 may refrain from sending the discovery message 130 to the second device 120 if the distance 102 is outside the discovery range threshold 114. It should be noted that the use of RTS and CTS messages for range determination is provided for illustration only. Selected embodiments may use messages other than RTS and CTS messages. For example, a different message that solicits a response within a fixed interval of time to determine distance may be used. Additional examples of range determination messages and responses are further described herein.

When the transmit power or MCS of the discovery message 130 results in the second device 120 being unable to decode the discovery message 130, the second device 120 may discard the discovery message. However, in heterogeneous networks that include both range adapted and range independent discovery messages, varying transmission attributes of individual devices may be complex. In another embodiment of operation, the second device 120 may limit wireless discovery range based on attribute(s) of the received discovery message 130, even if the discovery message 130 is otherwise decodable. For example, the receiver 121 may measure a RSSI of the discovery message 130 and may determine the distance 102 based on the RSSI. In a particular embodiment, the distance 102 may be determined by searching for the determined RSSI in a table 125 stored at the second device 120, where the table 125 associates RSSI values to expected distances. The values in the table 125 may be specified by an industry standard, such as an IEEE standard. When the distance 102 is within the discovery range threshold 114, the decoder 122 may decode the discovery message 130. When the distance 102 is outside the discovery range threshold 114, the discovery message 130 may be discarded. The second device 120 may also range adapt the discovery message 130 based on a transmit power indicator included in the discovery message 130 and/or based on the MCS of the discovery message 130.

Alternately, the second device 120 may limit wireless discovery range by using the timer 124 to measure the distance 102. For example, the second device 120 may send the RTS message 152 to the first device 110 and may receive the CTS message 154 in response. The timer 124 may be started upon sending the RTS message 152 and may be stopped upon receiving the CTS message 154. Based on the time elapsed, the second device 120 may estimate the distance 102. If the distance 102 is within the discovery range threshold 114, the second device 120 may decode the discovery message 130. Otherwise, the second device 120 may discard the discovery message 130. It should be noted that the discovery message 130 may have been received by the second device 120 prior to sending the RTS message 152 or may be received after having received the CTS message 154.

When operating in a heterogeneous network, the second device 120 may treat each discovery message 130 independently. When the range adaptation bit indicates that the discovery message 130 is range independent, the second device 120 may decode the discovery message 130 independent of whether its distance from the first device 110 is within the discovery range threshold 114. When the range adaptation bit indicates that the discovery message 130 is range adapted, the second device 120 may selectively decode or discard the discovery message 130 based on whether or not its distance from the first device 110 is less than the discovery range threshold 114.

In a particular embodiment, the distance 102 may be stored at the first device 110 and/or the second device 120 for use in subsequent range adaptation operations. Alternately, or in addition, the distance 102 may be recalculated periodically or in response to detecting movement of the first device 110 and/or the second device 120.

In a particular embodiment, the system 100 of FIG. 1 may support range determination mechanisms other than RTS/CTS message exchange. To illustrate, a location request/response exchange may be used. In response to receiving a location request from a first device, a second device may determine and/or transmit its location to the first device. For example, the second device may determine its location via a global positioning system (GPS) module or transceiver included within or otherwise accessible to the second device. Alternately, the first device may request the location of the second device from a third device (e.g., a location database). In yet another example, the second device may request its location from the third device and may forward the received location to the first device.

In a particular embodiment, before or after receiving the discovery message 130, the second device 120 may request a location of the first device 110 and may receive a response indicating the location of the first device 110. The second device 120 may determine the distance 102 based on the location of the first device 110 and may selectively decode or discard the discovery message 130 based on whether the distance 102 is within the discovery range threshold 114. In another particular embodiment, the first device 110 may request the location of the second device 120 and may condition sending of the discovery message 130 to the second device 120 based on whether the location of the second device 120 is within the discovery range threshold 114.

The system 100 of FIG. 1 may thus enable limiting wireless discovery range by both transmitting devices (e.g., the first device 110) as well as receiving devices (e.g., the second device 120). The system 100 may also support heterogeneous networks in which some discovery message are range limited while other discovery messages are range independent. In addition, by packaging actionable data (e.g., the information 131 or the URL 132) into the discovery message 130 instead of into a subsequent data message, the system 100 may leverage the discovery message 130 to introduce devices as well as communicate data between devices. This may enable simpler and faster data transfers than existing wireless methods, which may involve complex handshake and security processes after discovery and prior to data exchange. Selective range adaptation may also enable user-friendly range-aware wireless services, as further described with reference to FIG. 2.

Figure 2:
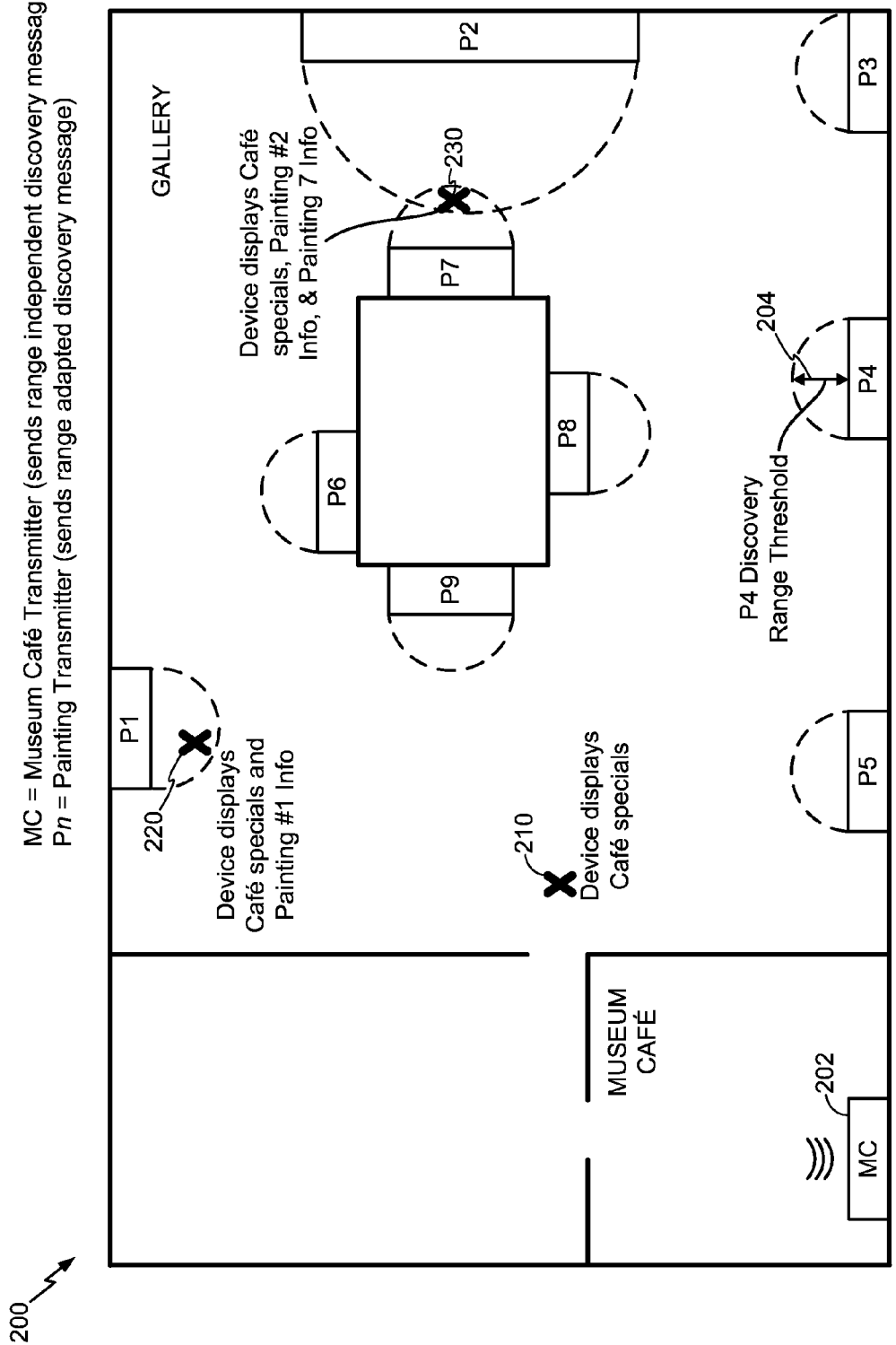
FIG. 2 is a diagram to illustrate an example of limiting wireless discovery range in a particular environment.

FIG. 2 is a diagram to illustrate a particular example of limiting wireless discovery range in a museum environment 200. It should be noted that the museum environment 200 is for illustration only. Limiting wireless discovery range in accordance with the techniques described herein may be performed in various other environments.

As illustrated in FIG. 2, the museum environment 200 includes a museum café and a gallery that has various paintings on display. The museum café includes a wireless transmitter 202 (designated "MC"). The wireless transmitter 202 may transmit discovery messages that are range independent (e.g., have a range adaptation bit set to zero) and that include information associated with the museum café (e.g., daily specials or a URL of a café menu). Each of the paintings (designated "P1" to "P9") may also have associated wireless transmitters. In contrast to the wireless transmitter 202 of the museum café, the discovery messages transmitted by the painting transmitters may be range adapted. For example, each of the discovery messages transmitted by the painting transmitters may have a range adaptation bit set to one and may include a corresponding discovery range threshold. To illustrate, the discovery range threshold for the painting "P4" is indicated in FIG. 2, at 204. It should be noted that different paintings may have different discovery range thresholds. For example, as shown in FIG. 2, the discovery range threshold for the painting "P2" is larger than the discovery range thresholds for the other paintings.

As a museum patron walks around the museum environment 200, a wireless device (e.g., mobile phone) of the patron may display range-aware information. For example, the patron may download and execute a museum tour application on the wireless device. Depending on where the patron is located, the patron's wireless device may receive discovery messages from various transmitters. The museum tour application on the wireless device may selectively decode or discard discovery messages as described with reference to FIG. 1.

For example, when the patron is at a first location 210, the patron's wireless device may decode the discovery message from the wireless transmitter 202 and may display café specials. Discovery messages received from any of the painting transmitters may be discarded because the first location 210 is not within any of the corresponding discovery range thresholds of the paintings. When the patron is at a second location 220, the patron's wireless device may display the café specials and information for the painting P1. When the patron is in a third location 230, the patron's wireless device may display the café specials, information for the painting P2, and information for the painting P7. When multiple patrons and wireless devices are in the museum environment 200, each patron's wireless device may display selected information based on where that patron is located. Thus, the same discovery message may be decoded by one wireless device (e.g., that is within the corresponding discovery range threshold) but discarded by another wireless device (e.g., that is outside the corresponding discovery range threshold).

Limiting wireless discovery range as described herein may thus enable user-friendly range-aware wireless services, such as the museum information service described with reference to FIG. 2. Notably, such services may be implemented without the use of dedicated access points that facilitate device-to-device communication and Internet access. Instead, each transmitter (e.g., the museum café transmitter 202 and the painting transmitters) may serve as an access point for an ad-hoc wireless network whose membership may be restricted by distance from the transmitter.

Figure 3:
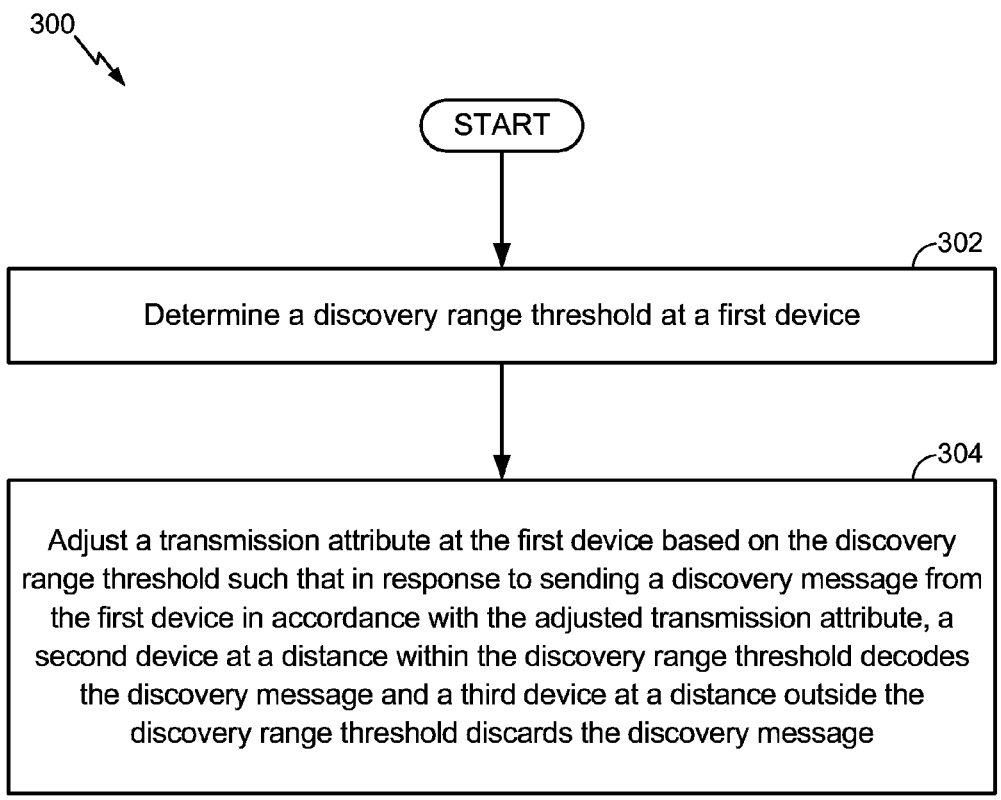
FIG. 3 is a flowchart of a particular embodiment of a method of limiting wireless discovery range at a transmitting device by adjusting a transmission attribute.

FIG. 3 is a flowchart of a particular embodiment of a method 300 of limiting wireless discovery range at a transmitting device by adjusting a transmission attribute. In an illustrative embodiment, the method 300 may be performed by the first device 110 of FIG. 1.

The method 300 may include determining a discovery range threshold at a first device, at 302. For example, in FIG. 1, the first device 110 may determine the discovery range threshold 114. The method 300 may also include adjusting a transmission attribute at the first device based on the discovery range threshold, at 304. The transmission attribute may be adjusted such that in response to sending a discovery message from the first device in accordance with the adjusted transmission attribute, a second device at a distance within the discovery range threshold decodes the discovery message. A third device at a distance outside the discovery range threshold discards the discovery message. For example, in FIG. 1, the first device 110 may adjust a transmission attribute (e.g., transmit power or MCS) of the discovery message 130 based on the discovery range threshold 114. When the distance 102 between the first device 110 and the second device 120 is within the discovery range threshold 114, the second device 120 may decode the discovery message 130. When the distance 102 is outside the discovery range threshold 114, the second device 120 (and/or a different third device not shown in FIG. 1) may discard the discovery message 130.

Figure 4:
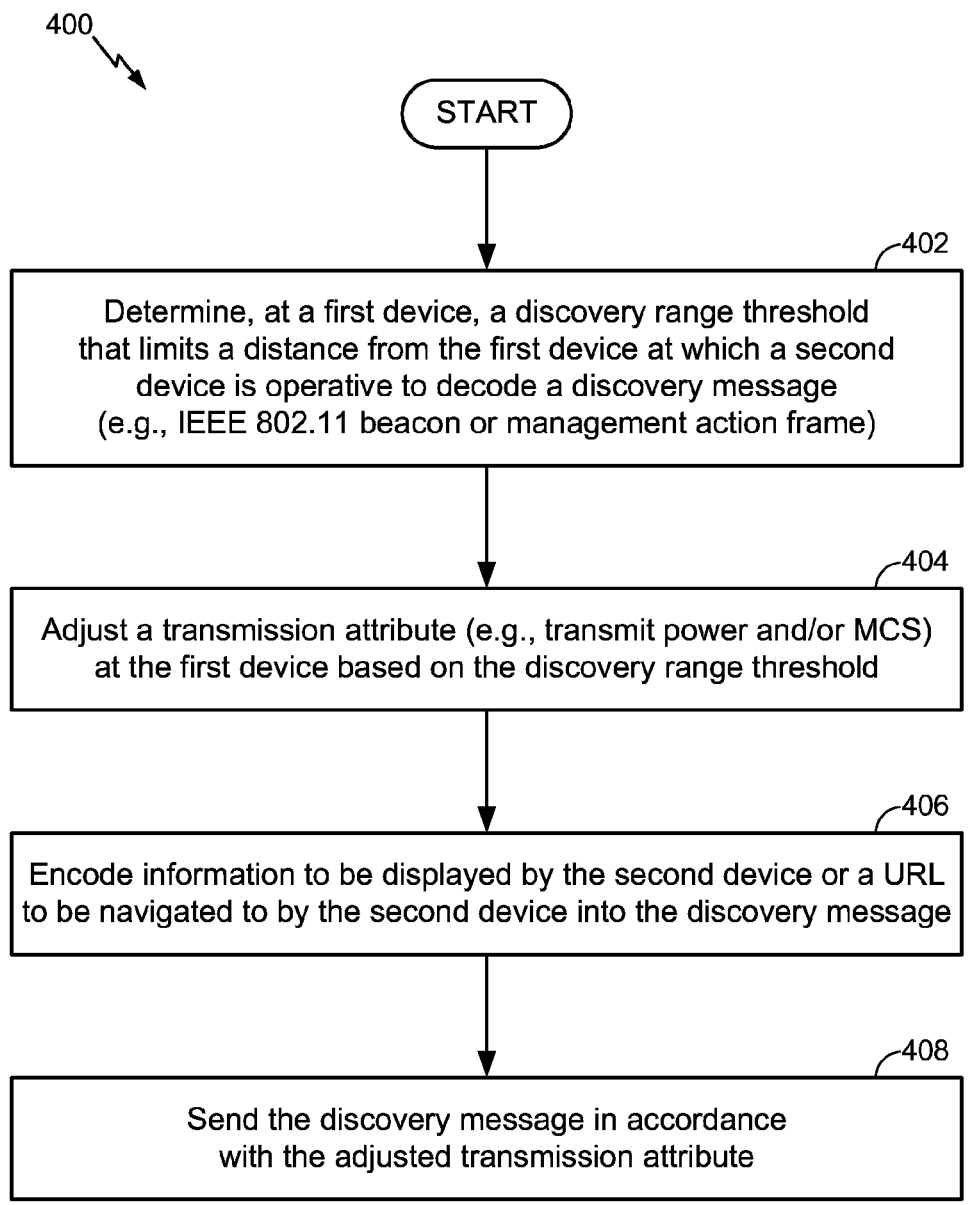
FIG. 4 is a flowchart of another particular embodiment of a method of limiting wireless discovery range at a transmitting device by adjusting a transmission attribute.

FIG. 4 is a flowchart of another particular embodiment of a method 400 of limiting wireless discovery range at a transmitting device by adjusting a transmission attribute. In an illustrative embodiment, the method 400 may be performed by the first device 110 of FIG. 1.

The method 400 may include determining, at a first device, a discovery range threshold that limits a distance from the first device at which a second device is operative to decode a discovery message, at 402. The discovery message may be an IEEE 802.11 beacon or a management action frame. For example, in FIG. 1, the first device 110 may determine the discovery range threshold 114.

The method 400 may also include adjusting a transmission attribute (e.g., transmit power and/or MCS) at the first device based on the discovery range threshold, at 404. The method 400 may further include encoding information to be displayed by the second device or a URL to be navigated to by the second device into the discovery message, at 406. For example, in FIG. 1, the encoder 112 may encode the displayable information 131 or the URL 132 into the discovery message 130.

The method 400 may include sending the discovery message in accordance with the adjusted transmission attribute, at 408. For example, in FIG. 1, the transmitter 111 may send (e.g., broadcast) the discovery message 130 using a transmit power level adjusted so that devices outside the discovery range threshold 114 do not decode the broadcast discovery message 130.

Figure 5:
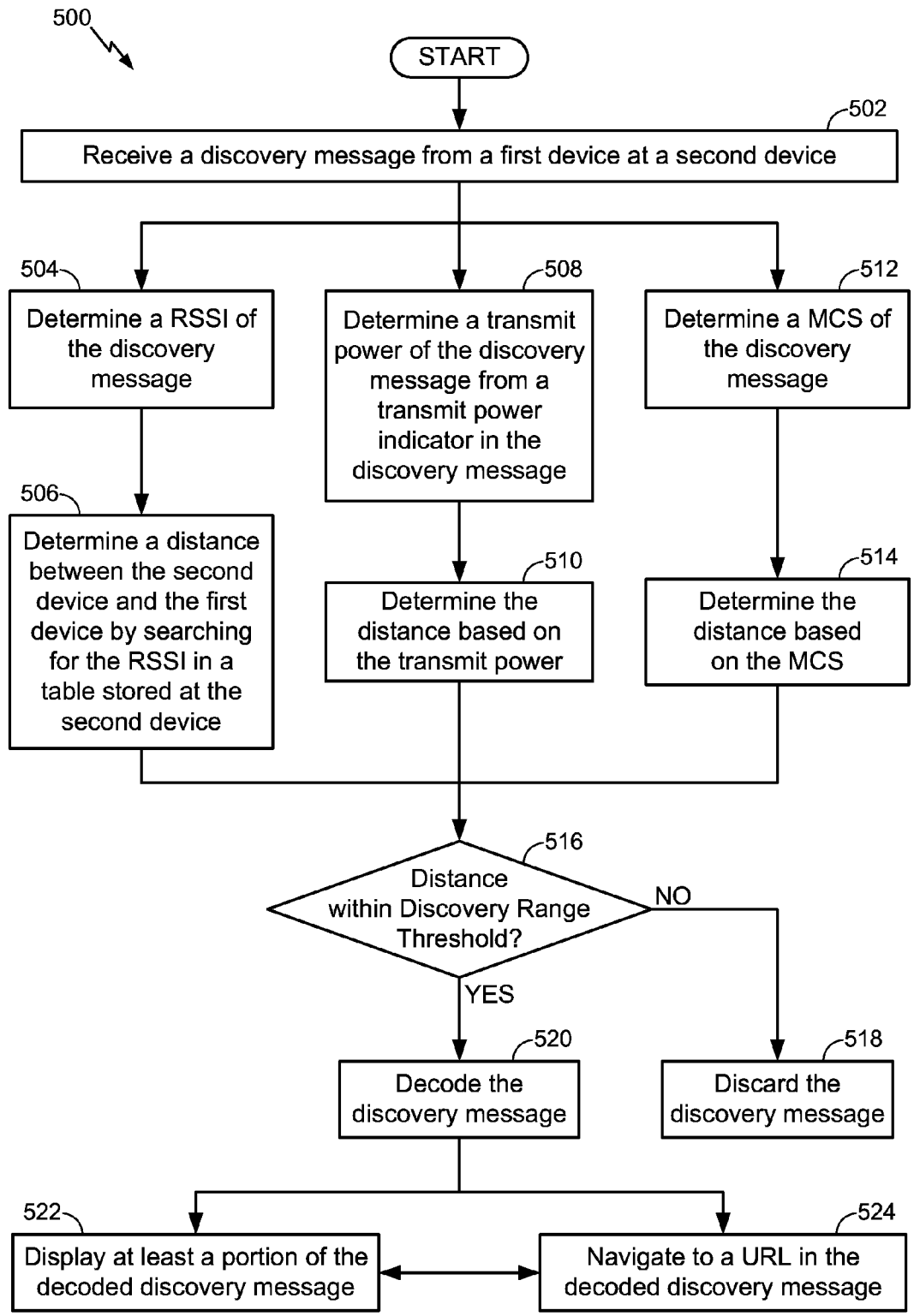
FIG. 5 is a flowchart of a particular embodiment of a method of limiting wireless discovery range at a receiving device based on an attribute of a received message.

FIG. 5 is a flowchart of a particular embodiment of a method 500 of limiting wireless discovery range at a receiving device based on an attribute of a received message. In an illustrative embodiment, the method 500 may be performed by the second device 120 of FIG. 1.

The method 500 may include receiving a discovery message from a first device at a second device, at 502. For example, in FIG. 1, the second device 120 may receive the discovery message 130 from the first device 110.

The method 500 may include determining a distance between the second device and the first device based on one or more attributes of the discovery message. To illustrate, a first implementation may include determining a RSSI of the discovery message, at 504, and determining the distance based on the RSSI, at 506. The distance may be determined by searching for the RSSI in a table stored at the second device. For example, in FIG. 1, the second device 120 may determine the distance 102 by searching the table 125. A second implementation may include determining a transmit power of the discovery message from a transmit power indicator in the discovery message, at 508, and determining the distance based on the transmit power, at 510. A third implementation may include determining a MCS of the discovery message, at 512, and determining the distance based on the MCS, at 514. For example, the distance may be determined based on whether the MCS is a "high data rate" MCS (implying a short distance between devices) or a "low data rate" MCS (implying a long distance between devices). A modulation scheme specified by the MCS may include binary phase-shift keying (BPSK), quadrature phase-shift keying (QPSK), 16-point quadrature amplitude modulation (16-QAM), or 64-point quadrature amplitude modulation (64-QAM). A coding rate specified by the MCS may include 1/2, 3/4, 2/3, or 5/6.

The method 500 may include determining whether the distance is within a discovery range threshold, at 516. For example, in FIG. 1, the second device 120 may determine whether the distance 102 is within the discovery range threshold 114. When the distance is outside the discovery range threshold, the method 500 may include discarding the discovery message, at 518.

When the distance is within the discovery range threshold, the method 500 may include decoding the discovery message, at 520. The method 500 may also include displaying at least a portion of the discovery message, at 522, and/or navigating to a URL in the decoded discovery message, at 524. For example, in FIG. 1, the second device 120 may display the information 131 and/or navigate to the URL 132 via the browser application 123.

Figure 6:
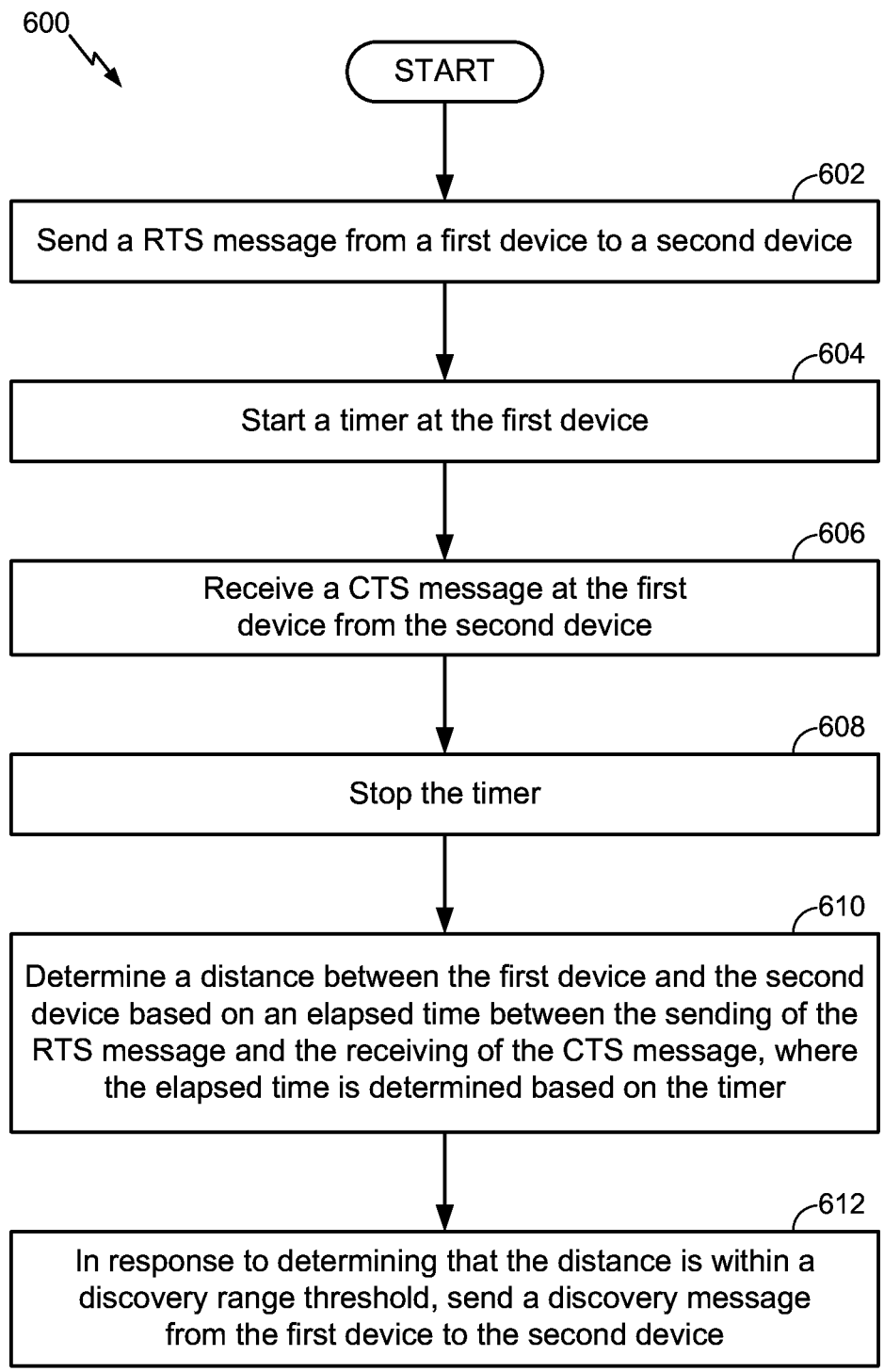
FIG. 6 is a flowchart of a particular embodiment of a method of limiting wireless discovery range at a device based on time elapsed between sending a RTS message and receiving a CTS message.

FIG. 6 is a flowchart of a particular embodiment of a method 600 of limiting wireless discovery range at a device based on time elapsed between sending a RTS message and receiving a CTS message. In an illustrative embodiment, the method 600 may be performed by the first device 110 of FIG. 1.

The method 600 may include sending a RTS message from a first device to a second device, at 602, and starting a timer at the first device, at 604. For example, in FIG. 1, the first device 110 may send the RTS message 142 and start the timer 113. The method 600 may also include receiving a CTS message at the first device from the second device, at 606, and stopping the timer, at 608. For example, in FIG. 1, the first device 110 may receive the CTS message 144 and stop the timer 113.

The method 600 may further include determining a distance between the first device and the second device based on an elapsed time between the sending of the RTS message and the receiving of the CTS message, where the elapsed time is determined based on the timer, at 610. For example, in FIG. 1, the first device 110 may determine the distance 102 based on the timer 113.

The method 600 may include, in response to determining that the distance is within a discovery range threshold, sending a discovery message from the first device to the second device, at 612. For example, in FIG. 1, the first device 110 may send the discovery message 130 to the second device 120 in response to determining that the distance 102 is within the discovery range threshold 114. If the distance is outside the discovery range threshold, the first device may refrain from sending the discovery message to the second device.

Figure 7:
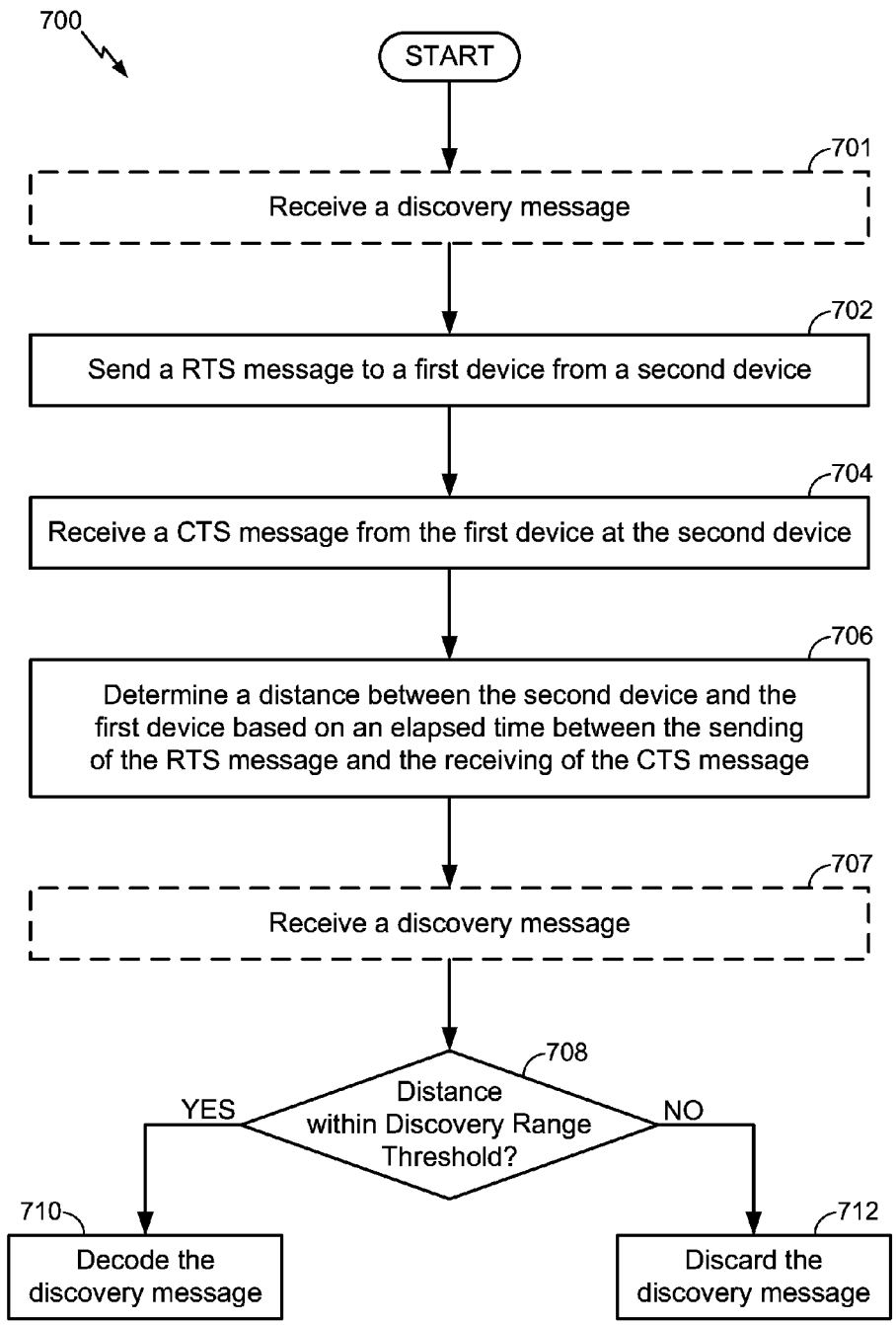
FIG. 7 is a flowchart of another particular embodiment of a method of limiting wireless discovery range at a device based on time elapsed between sending a RTS message and receiving a CTS message.

FIG. 7 is a flowchart of another particular embodiment of a method 700 of limiting wireless discovery range at a device based on time elapsed between sending a RTS message and receiving a CTS message. In an illustrative embodiment, the method 700 may be performed by the second device 120 of FIG. 1.

The method 700 may include sending a RTS message to a first device from a second device, at 702, and receiving a CTS message from the first device at the second device, at 704. For example, in FIG. 1, the second device 120 may send the RTS message 152 to the first device 110 and may receive the CTS message 154 in response.

The method 700 may also include determining a distance between the second device and the first device based on an elapsed time between the sending of the RTS message and the receiving of the CTS message, at 706. For example, in FIG. 1, the second device 120 may determine the distance 102. The method 700 may further include determining whether the distance 102 is within a discovery range threshold, at 708.

When the distance is within the discovery range threshold, the method 700 may include decoding a discovery message, at 710. In a particular embodiment, the discovery message may have been received, at 701, prior to sending the RTS message. Alternately, the discovery message may have been received, at 707, after receiving the CTS message. For example, in FIG. 1, the second device 120 may decode the discovery message 130 when the distance 102 is within the discovery range threshold 114.

When the distance is outside the discovery range threshold, the method 700 may include discarding the discovery message, at 712. For example, in FIG. 1, the second device 120 may discard the discovery message 130 when the distance 102 is outside the discovery range threshold 114.

Figure 8:
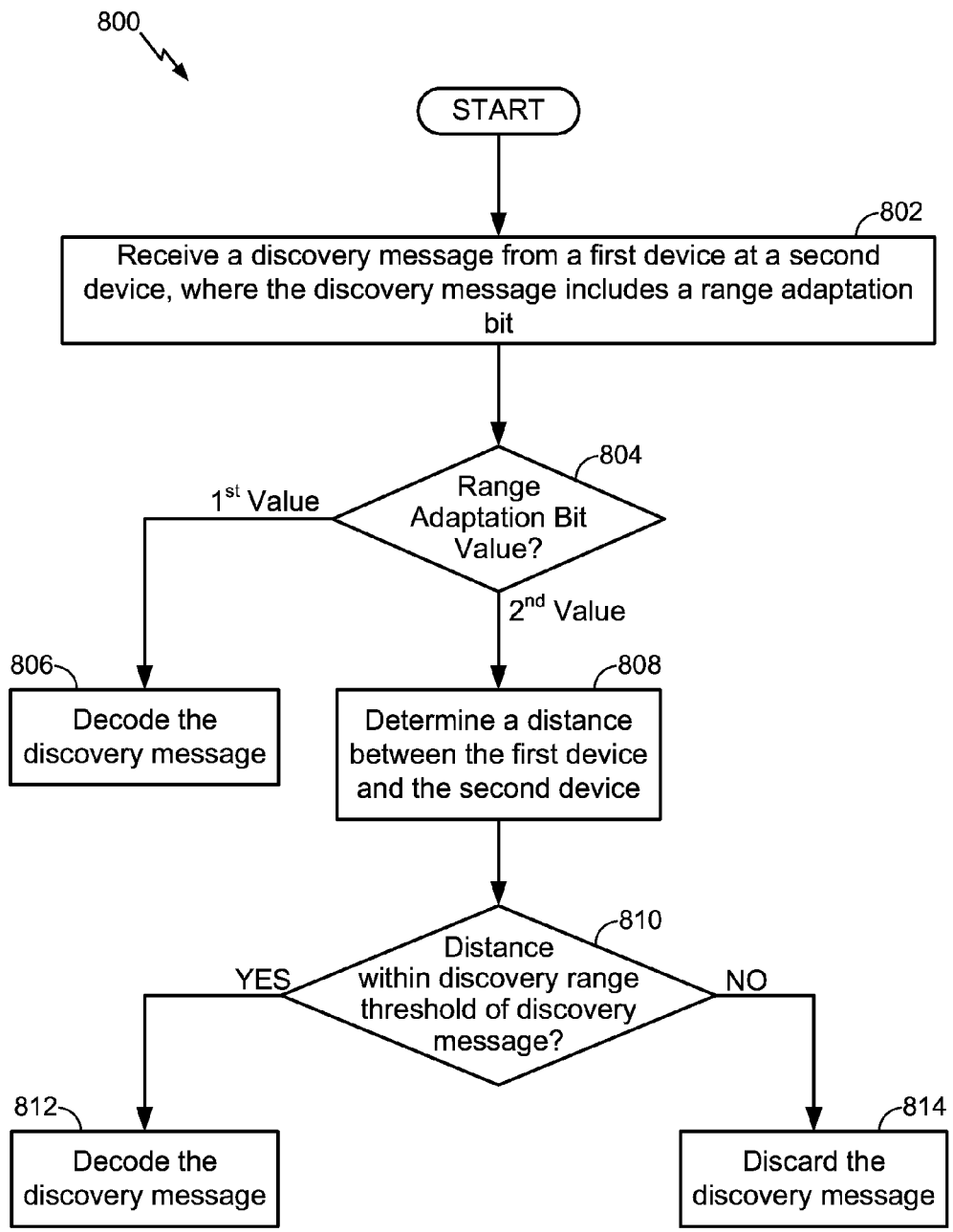
FIG. 8 is a flowchart of a particular embodiment of a method of operating a wireless device.

FIG. 8 is a flowchart of a particular embodiment of a method 800 of operating a wireless device. In an illustrative embodiment, the method 800 may be performed by the second device 120 of FIG. 1.

The method 800 may include receiving a discovery message from a first device at a second device, where the discovery message includes a range adaptation bit, at 802. For example, in FIG. 1, the second device 120 may receive the discovery message 130, where the discovery message 130 includes the range adaptation bit 133.

The method 800 may also include determining a value of the range adaptation bit, at 804. When the range adaptation bit has a first value, the method 800 may include decoding the discovery message, at 806. For example, in FIG. 1, when the range adaptation bit 133 has a first value (e.g., zero), the second device 120 may treat the discovery message 130 as range independent and may decode the discovery message 130.

When the range adaptation bit has a second value, the method 800 may include determining a distance between the first device and the second device, at 808. For example, in FIG. 1, when the range adaptation bit 133 has a second value (e.g., one), the second device 120 may treat the discovery message 130 as range adapted and may determine the distance 102. The method 800 may further include determining whether the distance is within a discovery range threshold of the discovery message, at 810. For example, in FIG. 1, the second device 120 may determine whether the distance 102 is within the discovery range threshold 114 included in or otherwise indicated by the discovery message 130.

When the distance is within the discovery range threshold, the method 800 may include decoding the discovery message, at 812. When the distance is outside the discovery range threshold, the method 800 may include discarding the discovery message, at 814. For example, in FIG. 1, the second device 120 may decode or discard the discovery message 130 based on whether the distance 102 is within the discovery range threshold 114.

Alternate embodiments of range determination may also be performed in accordance with the disclosure herein. For example, a service-providing device may receive a query message from a service-seeking device. The query message may include a request to set up a communication connection (e.g., a WiFi Direct connection) between devices, a request for information regarding services provided by a service-providing device, or some other message. In response to the query message, the service-providing device may determine a range.

In a particular embodiment, the service-providing device may determine the range based on an RSSI (e.g., by comparing the RSSI of the query message to a threshold). In another particular embodiment, the service-providing device may determine the range by initiating a round trip time (RTT) measurement operation (e.g., a RTS/CTS message exchange). RTT measurement may involve measuring a single message exchange or measuring multiple message exchanges (e.g., multiple RTS/CTS exchanges) and determining an average. In another particular embodiment, the service-providing device may use an alternate (e.g., non- 802.11 based) technology, such as Bluetooth or near field communication (NFC), to determine the range. In another particular embodiment, the service-providing device may use GPS to determine the range, as described with reference to FIG. 1. In another particular embodiment, the service-providing device may perform range determination based on fixed wireless access points or cellular towers (e.g., via triangulation of device positions). In another particular embodiment, the service-providing device may determine the range based on ranging with respect to a third device (e.g., the service-providing device may indicate that a service-seeking device is to be within a particular distance from an AP to receive services). The choice of range determination mechanism may be performed by software executing at a device above a media access control (MAC) layer.

In response to determining that the range between the service-providing device and the service-seeking device is within a threshold, the service-providing device may initiate operations for connection setup (e.g., set up a WiFi Direct connection).

In an alternate embodiment, the roles of the service-providing and service-seeking device may be reversed. To illustrate, a service-seeking device may receive a discovery message from a service-providing device. In response to the discovery message, the service-seeking device may determine a range to the service-providing device. The range may be determined using an RSSI of the discovery message, a RTT measurement operation, an alternate (e.g., non-802.11 based) technology, GPS, fixed wireless access points or cellular towers, or ranging with respect to a third device. In response to determining that the range between the service-seeking device and the service-providing device is within a threshold, the service-seeking device may initiate operations for connection setup (e.g., set up of a WiFi Direct connection).

Thus, a message (e.g., a query message or a discovery message) may include data indicating whether a range determination mechanism is to be used to determine whether to perform an action in response to the message. To illustrate, a device may receive a message and may decode the received message or a portion thereof (e.g., a preamble or a header). The device may determine that the message includes data indicating that range determination is to be performed. In some embodiments, the message may identify the particular type(s) of range determination mechanism(s) (e.g., RSSI, RTT, GPS, alternate technology, etc.) to be used, as further described with reference to FIGS. 10-11. If range determination conditions are satisfied, the device may perform one or more actions (e.g., decode the rest of the received message, initiate connection setup, etc.).

It should be noted that the various range determination methods described herein may be combined. For example, a range determination hierarchy may include using RSSI as a gate keeping indicator. If the RSSI of a received message is lower than an RSSI threshold (e.g., indicating that the devices are separated by a distance that is greater than or equal to a first range threshold), the range determination process may end. Conversely, if the RSSI of a received message satisfies the RSSI threshold (e.g., indicating that the devices are separated by a distance that is less than the first range threshold), the range determination process may continue and a more accurate range determination mechanism may be initiated (e.g., to determine whether the devices are within a second range threshold). For example, a next level of the range determination hierarchy may include initiating a RTT measurement process. Thus, the RTT measurement process, which can take longer (e.g., a few milliseconds) to perform than RSSI comparison, is not initiated for messages that correspond to a low RSSI (i.e., RSSI less than the RSSI threshold). As another example, the range determination hierarchy may involve using alternate technologies (e.g., Bluetooth, NFC, etc.) as a last resort, because use of such technologies may involve powering up circuitry that is in a sleep mode. In another particular embodiment, the range determination hierarchy may include prioritizing use of such alternate technology if available.

In a particular embodiment, in response to determining that a range determination mechanism is to be executed, a device (e.g., a service-providing device and/or a service-seeking device) may reserve a time period to execute the range determination mechanism. For example, the time period may be reserved using a discovery message. To illustrate, when a RTT measurement operation is to be performed, time may be reserved to perform frame exchanges (e.g., RTS/CTS frame exchanges).

It should be noted that range determination may not merely be a one-time check to determine whether or not to perform an action in response to a discovery message or query message. For example, when a first device (e.g., a service-seeking device or a service-providing device) determines that range determination is to be performed, the first device may perform range determination multiple times to verify that the first device continues to remain within a range threshold of a second device (e.g., a service-providing device or a service-seeking device). To illustrate, such range determination may be performed continuously and/or periodically (e.g., by continuing to monitor RSSI, by performing periodic RTT measurements etc.).

Figure 10:
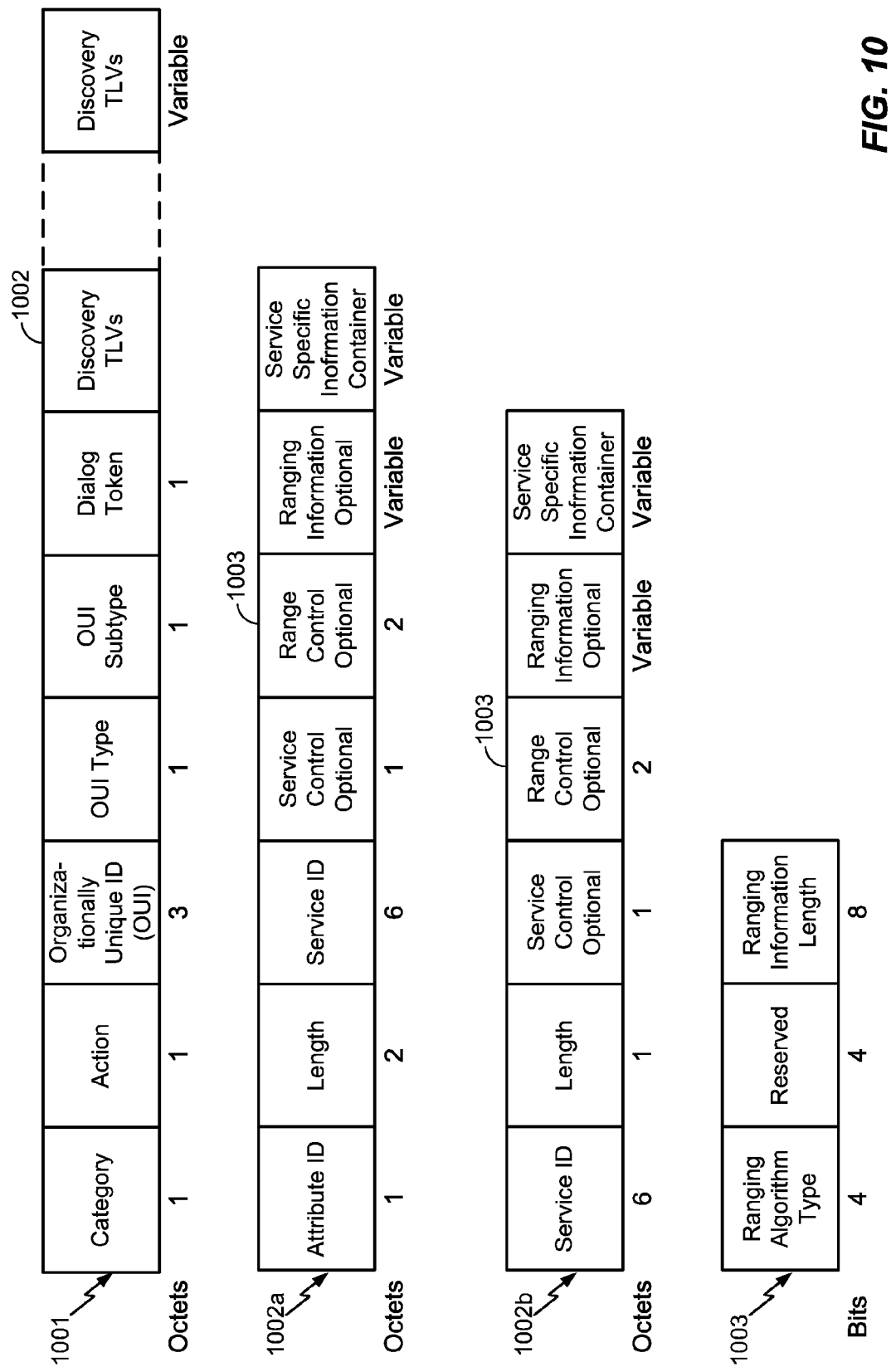
FIG. 10 illustrates a discovery frame 1001 that includes one or more discovery type-length-values (TLVs)
Figure 11:
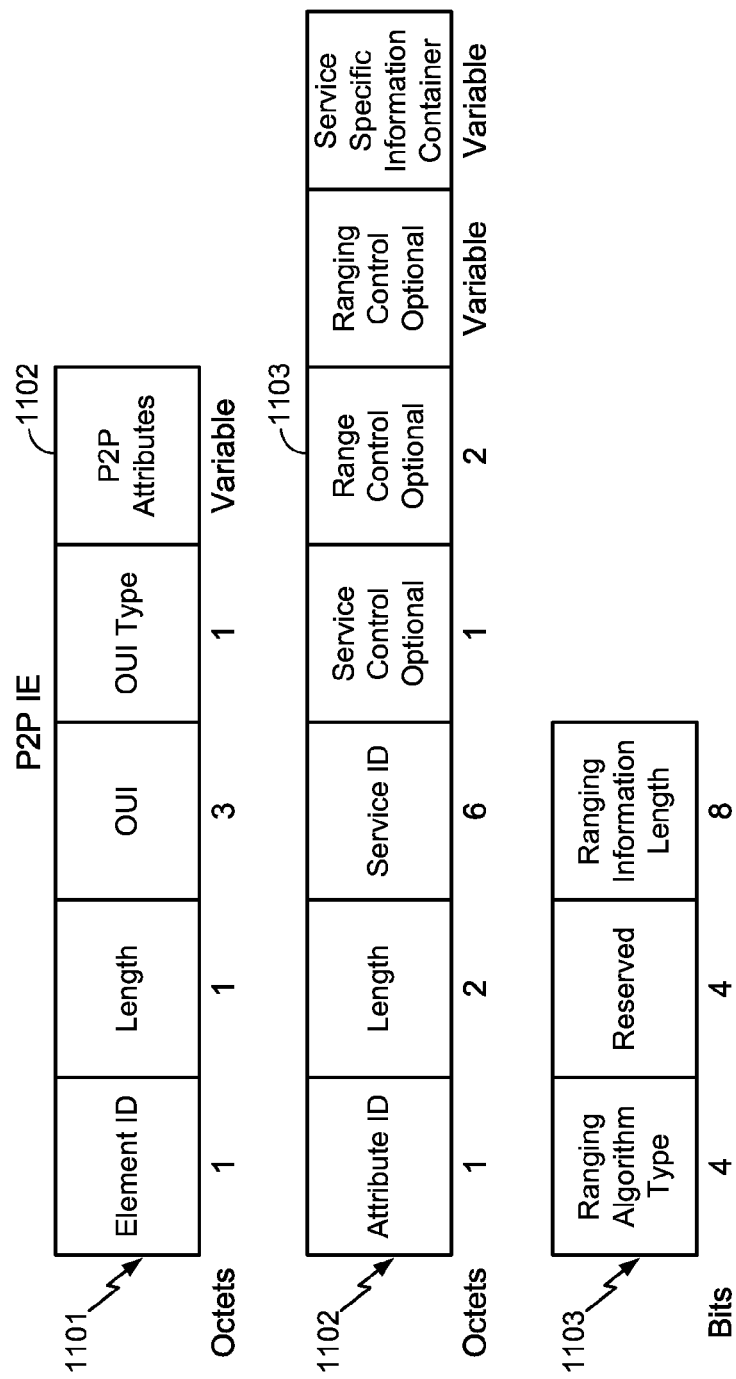
FIG. 11 illustrates an alternate embodiment of a discovery frame.

In a particular embodiment, discovery and/or query messages may include a transmit power indication to assist receiving devices in performing range determination. FIGS. 10-11 illustrate particular embodiments of a discovery message (e.g., frames), such as the discovery message 130 of FIGS. 1 and 9. For example, FIG. 10 illustrates a discovery frame 1001 that includes one or more discovery type-length-values (TLVs) 1002.

Two embodiments of the discovery TLV(s) 1002 are shown in FIG. 10 and designed 1002a and 1002b, respectively. The discovery TLV(s) 1002 may include a six-byte service identifier (ID), as shown. In a particular embodiment, the service ID may be a hash of an application type or service type. For example, when a device stores music videos, the service ID may be a six-byte hash of the string "music videos."

In a particular embodiment, the discovery TLV(s) 1002 may include a two-byte range control field 1003. The range control field 1003 may include four bits that indicate the ranging algorithm (e.g., range determination mechanism) in use (e.g., RSSI, RTT, GPS, etc.).

FIG. 11 illustrates an alternate embodiment of a discovery frame 1101. In FIG. 11, the discovery frame 1101 is a peer-to-peer information element (P2P IE) that includes a P2P attributes field 1102. The P2P attributes field includes a range control field 1103, as shown.

Figure 9:
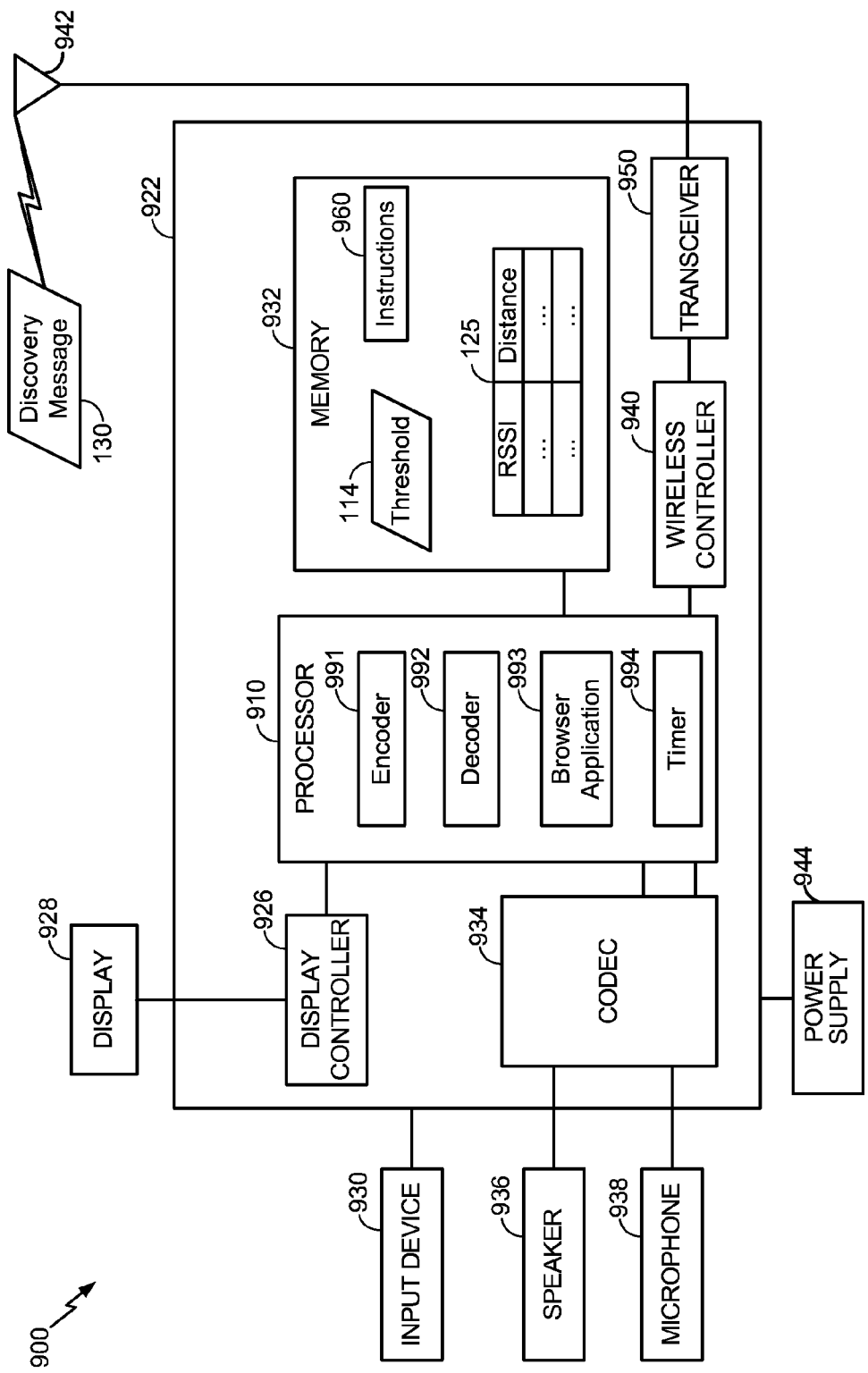
FIG. 9 is a block diagram of a mobile communication device including components that are operable to limit wireless discovery range.

FIG. 9 is a block diagram of a mobile communication device 900. In one embodiment, the mobile communication device 900, or components thereof, include or are included within the first device 110 FIG. 1, the second device 120 of FIG. 1, the museum transmitter 202 of FIG. 2, and/or the transmitters associated with the paintings "P1" to "P9" of FIG. 2. Further, all or part of the methods described in FIGS. 3-8 may be performed at or by the mobile communication device 900. The mobile communication device 900 includes a processor 910, such as a digital signal processor (DSP), coupled to a memory 932.

The memory 932 may be a non-transitory tangible computer-readable and/or processor-readable storage device that stores instructions 960. The instructions 960 may be executable by the processor 910 to perform one or more functions or methods described herein, such as the methods described with reference to FIGS. 3-8. The memory 932 may also store the discovery range threshold 114 and the table 125 associating RSSI values to expected distances.

The processor 910 may also include, implement, or execute device components described with reference to FIG. 1. For example, the processor 910 may include an encoder 991 (e.g., the encoder 112 of FIG. 1), may include a decoder 992 (e.g., the decoder 122 of FIG. 1), may execute a browser application 993 (e.g., the browser application 123 of FIG. 1, and/or may start and stop a timer 994 (e.g., the timer 113 or the timer 124 of FIG. 1).

FIG. 9 also shows a display controller 926 that is coupled to the processor 910 and to a display 928. For example, the display 928 may display information included in the discovery message 130, as described with reference to the information 131 of FIG. 1. The display 928 may also display the results of navigating to a URL included in the discovery message 130, as described with reference to the URL 132 of FIG. 1.

A coder/decoder (CODEC) 934 can also be coupled to the processor 910. A speaker 936 and a microphone 938 can be coupled to the CODEC 934. FIG. 9 also indicates that a wireless controller 940 can be coupled to the processor 910, where the wireless controller 940 is in communication with an antenna 942 via a transceiver 950. The wireless controller 940, the transceiver 950, and the antenna 942 may thus represent a wireless interface that enables wireless communication by the mobile communication device 900. For example, such a wireless interface may be used to send or receive the discovery message 130. The mobile communication device 900 may include numerous wireless interfaces, where different wireless networks are configured to support different networking technologies or combinations of networking technologies.

In a particular embodiment, the processor 910, the display controller 926, the memory 932, the CODEC 934, the wireless controller 940, and the transceiver 950 are included in a system-in-package or system-on-chip device 922. In a particular embodiment, an input device 930 and a power supply 944 are coupled to the system-on-chip device 922. Moreover, in a particular embodiment, as illustrated in FIG. 9, the display 928, the input device 930, the speaker 936, the microphone 938, the antenna 942, and the power supply 944 are external to the system-on-chip device 922. However, each of the display device 928, the input device 930, the speaker 936, the microphone 938, the antenna 942, and the power supply 944 can be coupled to a component of the system-on-chip device 922, such as an interface or a controller.

In conjunction with the described embodiments, an apparatus may include means for determining, at a first device, a discovery range threshold that limits a distance at which a second device is operative to decode a discovery message from the first device. For example, the means for determining may include a component of the first device 110 of FIG. 1 (e.g., a processor), one or more components of the mobile communication device 900 of FIG. 9, one or more other devices configured to determine a discovery range threshold, or any combination thereof. The apparatus may also include means for adjusting a transmission attribute at the first device based on the discovery range threshold. For example, the means for adjusting may include the transmitter 111 of FIG. 1, one or more components of the mobile communication device 900 of FIG. 9, one or more other devices configured to adjust a transmission attribute, or any combination thereof. The apparatus may further include means for sending the discovery message in accordance with the adjusted transmission attribute. For example, the means for sending may include the transmitter 111 of FIG. 1, one or more components of the mobile communication device 900 of FIG. 9, one or more other devices configured to send a message, or any combination thereof.

In another aspect, an apparatus may include means for receiving a discovery message from a first device at a second device. For example, the means for receiving may include the receiver 121 of FIG. 1, one or more components of the mobile communication device 900 of FIG. 9, one or more other devices configured to receive a message, or any combination thereof. The apparatus may also include means for determining a distance between the second device and the first device based on at least one attribute of the discovery message. For example, the means for determining may include a component of the second device 120 of FIG. 1 (e.g., a processor), one or more components of the mobile communication device 900 of FIG. 9, one or more other devices configured to determine a distance, or any combination thereof. The apparatus may further include means for decoding the discovery message when the distance is within a discovery range threshold. For example, the means for decoding may include the decoder 122 of FIG. 1, one or more components of the mobile communication device 900 of FIG. 9, one or more other devices configured to decode a message, or any combination thereof. The apparatus may include means for discarding the discovery message when the distance is outside the discovery range threshold. For example, the means for discarding may include a component of the second device 120 of FIG. 1 (e.g., a processor), one or more components of the mobile communication device 900 of FIG. 9, one or more other devices configured to discard a message, or any combination thereof.

In another aspect, an apparatus may include means for sending a range determination message from a first device to a second device. For example, the means for sending may include the transmitter 111 of FIG. 1, one or more components of the mobile communication device 900 of FIG. 9, one or more other devices configured to send a message, or any combination thereof. The apparatus may also include means for receiving a range determination response at the first device from the second device. For example, the means for receiving may include the receiver 116 of FIG. 1, one or more components of the mobile communication device 900 of FIG. 9, one or more other devices configured to receive a message, or any combination thereof. The apparatus may further include means for determining a distance between the first device and the second device based on an elapsed time between the sending of the range determination message and the receiving of the range determination response. For example, the means for determining may include the timer 113, another component of the first device 110 of FIG. 1 (e.g., a processor), one or more components of the mobile communication device 900 of FIG. 9, one or more other devices configured to determine a distance based on an elapsed time, or any combination thereof. The apparatus may include means for sending a discovery message from the first device to the second device in response to determining that the distance is within a discovery range threshold. For example, the means for sending may include the transmitter 111 of FIG. 1, one or more components of the mobile communication device 900 of FIG. 9, one or more other devices configured to send a message, or any combination thereof.

In another aspect, an apparatus may include means for sending a range determination message to a first device from a second device. For example, the means for sending may include the transmitter 126 of FIG. 1, one or more components of the mobile communication device 900 of FIG. 9, one or more other devices configured to send a message, or any combination thereof. The apparatus may also include means for receiving a range determination response from the first device at the second device. For example, the means for receiving may include the receiver 121 of FIG. 1, one or more components of the mobile communication device 900 of FIG. 9, one or more other devices configured to receive a message, or any combination thereof. The apparatus may further include means for determining a distance between the second device and the first device based on an elapsed time between the sending of the range determination message and the receiving of the range determination response. For example, the means for determining may include a component of the second device 120 of FIG. 1 (e.g., a processor), one or more components of the mobile communication device 900 of FIG. 9, one or more other devices configured to determine a distance, or any combination thereof. The apparatus may include means for decoding a discovery message received from the first device when the distance is within a discovery range threshold. For example, the means for decoding may include the decoder 122 of FIG. 1, one or more components of the mobile communication device 900 of FIG. 9, one or more other devices configured to decode a message, or any combination thereof. The apparatus may also include means for discarding the discovery message received from the first device when the distance is outside the discovery range threshold. For example, the means for discarding may include a component of the second device 120 of FIG. 1 (e.g., a processor), one or more components of the mobile communication device 900 of FIG. 9, one or more other devices configured to discard a message, or any combination thereof.

In another aspect, an apparatus may include means for determining a discovery range threshold at a first device. For example, the means for determining may include a component of the first device 110 of FIG. 1 (e.g., a processor), one or more components of the mobile communication device 900 of FIG. 9, one or more other devices configured to determine a discovery range threshold, or any combination thereof. The apparatus may also include means for sending a discovery message from the first device to a second device. The discovery message may include data indicating whether a range determination mechanism is to be used to determine whether to perform an action (e.g., connection setup) in response to the discovery message. For example, the means for sending may include the transmitter 111 of FIG. 1, one or more components of the mobile communication device 900 of FIG. 9, one or more other devices configured to send a message, or any combination thereof.

In another aspect, an apparatus may include means for receiving a discovery message from a first device at a second device, where the discovery message includes a range adaptation indicator bit. For example, the means for receiving may include the receiver 121 of FIG. 1, one or more components of the mobile communication device 900 of FIG. 9, one or more other devices configured to receive a discovery message, or any combination thereof. The apparatus may also include means, responsive to the range adaptation bit having a first value, for decoding the discovery message. For example, the means for decoding may include the decoder 122 of FIG. 1, one or more components of the mobile communication device 900 of FIG. 9, one or more other devices configured to decode a message, or any combination thereof. The apparatus may further include means, responsive to the range adaptation bit having a second value, for selectively decoding or discarding the discovery message based on whether a distance between the second device and the first device is within a discovery range threshold included in the discovery message. For example, the means for selectively decoding or discarding may include the decoder 122 of FIG. 1, another component of the second device 120 of FIG. 1 (e.g., a processor), one or more components of the mobile communication device 900 of FIG. 9, one or more other devices configured to selectively decode or discard a message, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
sending a discovery message from a first device to a second device,
wherein the discovery message includes data indicating whether a range determination mechanism is to be used to determine whether to perform an action in response to the discovery message,
wherein the data includes a range adaptation bit,
wherein a first value of the range adaptation bit indicates that the second device is to further process the discovery message after detecting the range adaptation bit independent of whether a distance between the first device and the second device is within a discovery range threshold, and
wherein a second value of the range adaptation bit indicates that the second device is to selectively process or discard the discovery message based on whether the distance is within the discovery range threshold.

2. The method of claim 1, wherein the discovery message further includes the discovery range threshold.

3. The method of claim 1, wherein the range determination mechanism is based on a received signal strength indication (RSSI) of the discovery message, a transmit power level of the discovery message, or any combination thereof.

4. The method of claim 1, wherein the range determination mechanism is based on a round trip time measurement.

5. The method of claim 1, wherein the discovery message is sent via a wireless network that is compliant with a first networking technology and wherein the range determination mechanism is based on a second networking technology that is different from the first networking technology.

6. The method of claim 5, wherein the range determination mechanism is based on a Bluetooth signal, a near field communication (NFC) signal, or any combination thereof.

7. The method of claim 1, wherein the range determination mechanism is based on a global positioning system (GPS) signal.

8. The method of claim 1, wherein the range determination mechanism is based on at least one measurement with respect to a third device that is distinct from the first device and the second device.

9. The method of claim 8, wherein the third device comprises a wireless access point, a cellular tower, or any combination thereof.

10. The method of claim 1, wherein the discovery message includes at least one discovery type-length-value (TLV).

11. The method of claim 10, wherein the at least one discovery TLV includes a range control field.

12. The method of claim 11, wherein the range control field identifies the range determination mechanism.

13. The method of claim 1, wherein the discovery message comprises a peer-to-peer information element (P2P IE).

14. The method of claim 13, wherein the P2P IE includes a range control field.

15. The method of claim 14, wherein the range control field identifies the range determination mechanism.

16. An apparatus comprising:
a processor; and
a memory storing instructions executable by the processor to send a discovery message from a first device to a second device,
wherein the discovery message includes data indicating whether a range determination mechanism is to be used to determine whether to perform an action in response to the discovery message,
wherein the data includes a range adaptation bit,
wherein a first value of the range adaptation bit indicates that the second device is to further process the discovery message after detecting the range adaptation bit independent of whether a distance between the first device and the second device is within a discovery range threshold, and
wherein a second value of the range adaptation bit indicates that the second device is to selectively process or discard the discovery message based on whether the distance is within the discovery range threshold.

17. The apparatus of claim 16, wherein the action comprises initiating setup of a WiFi Direct connection between the first device and the second device.

18. A non-transitory processor-readable medium storing instructions that, when executed by a processor, cause the processor to:
send a discovery message from a first device to a second device,
wherein the discovery message includes data indicating whether a range determination mechanism is to be used to determine whether to perform an action in response to the discovery message,
wherein the data includes a range adaptation bit,
wherein a first value of the range adaptation bit indicates that the second device is to further process the discovery message after detecting the range adaptation bit independent of whether a distance between the first device and the second device is within a discovery range threshold, and
wherein a second value of the range adaptation bit indicates that the second device is to selectively process or discard the discovery message based on whether the distance is within the discovery range threshold.

19. An apparatus comprising:
means for determining a discovery range threshold at a first device; and
means for sending a discovery message from the first device to a second device,
wherein the discovery message includes data indicating whether a range determination mechanism is to be used to determine whether to perform an action in response to the discovery message,
wherein the data includes a range adaptation bit,
wherein a first value of the range adaptation bit indicates that the second device is to further process the discovery message after detecting the range adaptation bit independent of whether a distance between the first device and the second device is within a discovery range threshold, and
wherein a second value of the range adaptation bit indicates that the second device is to selectively process or discard the discovery message based on whether the distance is within the discovery range threshold.

20. A method comprising:
receiving a discovery message from a first device at a second device, wherein the discovery message includes a range adaptation bit;
when the range adaptation bit has a first value, further processing the discovery message in response to determining the range adaptation bit has the first value; and
when the range adaptation bit has a second value, selectively processing or discarding the discovery message based on whether a distance between the second device and the first device is within a discovery range threshold included in the discovery message.

21. An apparatus comprising:
a processor; and
a memory storing instructions executable by the processor to:
receive a discovery message from a first device at a second device, wherein the discovery message includes a range adaptation bit;
when the range adaptation bit has a first value, further process the discovery message after determining that the range adaptation bit has the first value; and
when the range adaptation bit has a second value, selectively further process or discard the discovery message after determining that the range adaptation bit has the second value and based on whether a distance between the second device and the first device is within a discovery range threshold included in the discovery message.

22. A non-transitory processor-readable medium storing instructions that, when executed by a processor, cause the processor to:
receive a discovery message from a first device at a second device, wherein the discovery message includes a range adaptation bit;
when the range adaptation bit has a first value, further process the discovery message after determining that the range adaptation bit has the first value; and
when the range adaptation bit has a second value, selectively further process or discard the discovery message after determining that the range adaptation bit has the second value and based on whether a distance between the second device and the first device is within a discovery range threshold included in the discovery message.

23. An apparatus comprising:
means for receiving a discovery message from a first device at a second device, wherein the discovery message includes a range adaptation bit;
means, responsive to the range adaptation bit having a first value, for further processing the discovery message after determining the range adaptation bit has the first value; and
means, responsive to the range adaptation bit having a second value, for selectively further processing or discarding the discovery message after determining that the range adaptation bit has the second value and based on whether a distance between the second device and the first device is within a discovery range threshold included in the discovery message.

24. The apparatus of claim 16, wherein the range determination mechanism is based on a received signal strength indication (RSSI) of the discovery message, a transmit power level of the discovery message, or any combination thereof.

25. The non-transitory processor-readable medium of claim 18, wherein the range determination mechanism is based on a received signal strength indication (RSSI) of the discovery message, a transmit power level of the discovery message, or any combination thereof.

26. The apparatus of claim 19, wherein the range determination mechanism is based on a received signal strength indication (RSSI) of the discovery message, a transmit power level of the discovery message, or any combination thereof.

27. The method of claim 20, further comprising in response to determining that the range adaptation bit has the second value, determining the distance between the second device and the first device based on a received signal strength indication (RSSI) of the discovery message.

28. The apparatus of claim 21, wherein the instructions are further executable by the processor to, when the range adaptation bit has the second value, determine the distance between the second device and the first device based on a received signal strength indication (RSSI) of the discovery message.

29. The non-transitory processor-readable medium of claim 22, wherein the instructions further cause the processor to, when the range adaptation bit has the second value, determine the distance between the second device and the first device based on a received signal strength indication (RSSI) of the discovery message.

30. The apparatus of claim 23, further comprising means, responsive to the range adaptation bit having the second value, for determining the distance between the second device and the first device based on a received signal strength indication (RSSI) of the discovery message.

* * * * *